United States Patent [19]

Simpson

[11] Patent Number: 4,494,473
[45] Date of Patent: Jan. 22, 1985

[54] SURFACE EFFECT SHIP STERN SEAL
[75] Inventor: Anthony Y. Simpson, Slidell, La.
[73] Assignee: Textron Inc., Providence, R.I.
[21] Appl. No.: 511,155
[22] Filed: Jul. 6, 1983
[51] Int. Cl.³ .............................................. B60V 1/16
[52] U.S. Cl. ................... 114/67 A; 180/127; 180/126; 180/122
[58] Field of Search ............ 114/67 A, 67 R; 180/116, 117, 118, 119, 120, 121, 122, 123, 124, 125, 126, 127, 128, 129, 130

[56] References Cited

U.S. PATENT DOCUMENTS

| 3,272,275 | 9/1966 | Faure | 180/127 |
| 3,353,617 | 11/1967 | Hopkins | 180/127 |
| 3,511,331 | 5/1970 | Landry | 180/127 |
| 4,083,425 | 4/1978 | Rickards | 180/127 |

FOREIGN PATENT DOCUMENTS 1089464 11/1967 United Kingdom ............... 180/127

Primary Examiner—Trygve M. Blix
Assistant Examiner—Patrick W. Young
Attorney, Agent, or Firm—Bean, Kauffman & Bean

[57] ABSTRACT

There is disclosed a surface effect ship stern seal system comprising a plurality of side-by-side vertically standing inflatable fingers of open top form, the leading end portions of the fingers being attached to the hull by resilient means and the bottom edges of the sidewalls of the fingers being closed by water planing plate means. The upper edges of the sidewall portions of the fingers are carried by tension ropes connecting at their leading ends to said resilient means and at their aft ends to the ship hull, reclining therebetween in catenary fashion.

16 Claims, 3 Drawing Figures

U.S. Patent Jan. 22, 1985 4,494,473
Fig. 1.
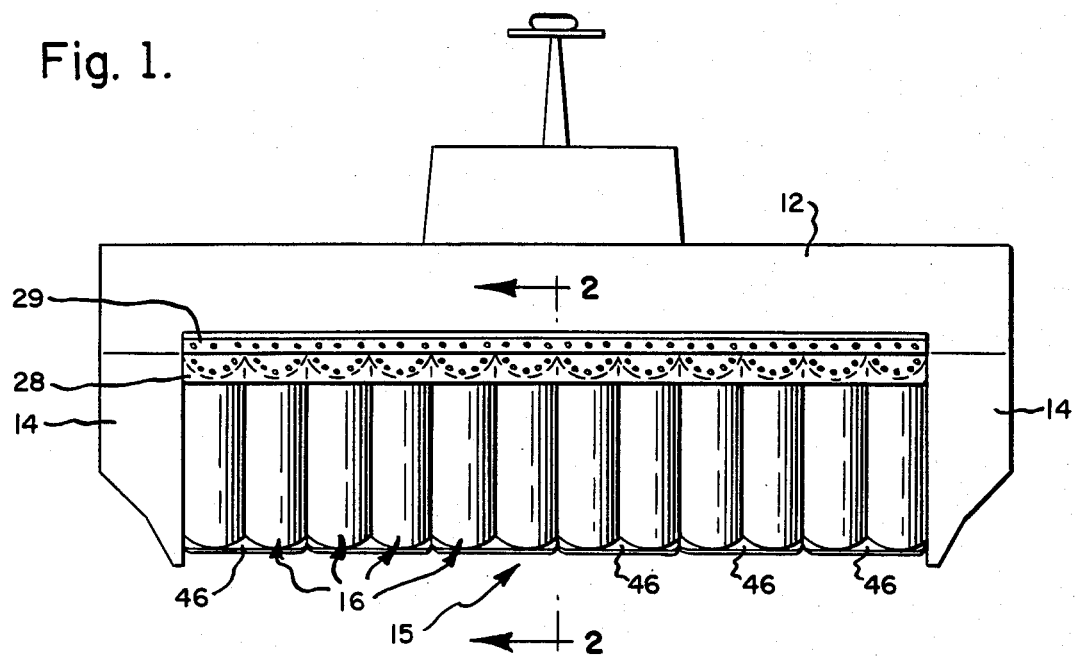
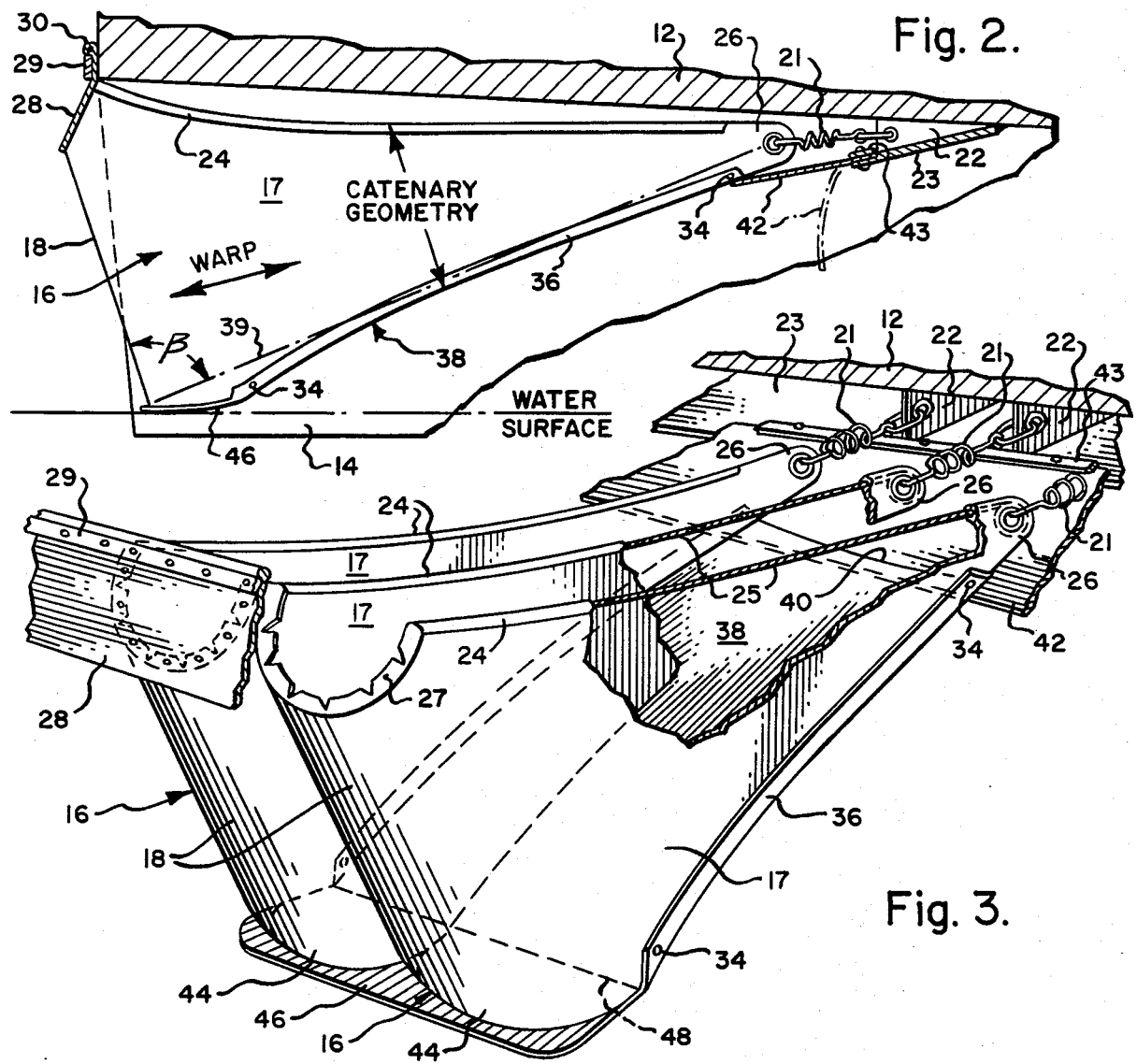
Fig. 2.
Fig. 3.

SURFACE EFFECT SHIP STERN SEAL

BACKGROUND AND OBJECTS OF THE INVENTION

This invention relates to air cushion supported marine vehicles such as are referred to as "surface effect ships" (SES). The invention provides an improvement in respect to the prior type air cushion seals employed at the stern ends of such vessels, which have in the past typically employed a plurality of side-by-side vertically disposed air-inflated "fingers" extending between the opposite sidehulls of the ship. Examples of such prior art are disclosed in U.S. Pat. Nos. 3,260,323; 3,297,102; 3,372,664; 3,420,330; 3,443,659; 3,756,343 and 3,907,061. Such seal systems may comprise any number of segments or fingers arranged in side-by-side relation; and in any case they individually depend from the hull structure of the ship so as to bridge across the stern end of the air cushion space beneath the ship.

However, in the case of stern seals of the type shown in the above referenced patents, the anti-scooping protective sheets thereof tend to locally distort especially under severe operating conditions, and therefore generate drag and occasionally permit the fingers to ingest water from the traveling surface, thereby impeding operation of the ship. It is an object of the present invention to provide for a SES an improved stern seal system which minimizes the possibility of such undesirable occurrences under typical operating conditions, and to more readily off-load any water scooping loads such as may occur.

Buffeting wear and tear effects on the water-wave contact portions of the fingers of such seals require that for continuing efficient operations of the ship the fingers thereof need be repaired or replaced from time to time, depending upon the severities of service imposed thereon. Therefore, another object of the invention is to provide a stern seal construction as aforesaid wherein the fingers thereof are less subject to flagellation forces and are more readily serviceable while the vessel is standing in water. Still another object is to provide an improved finger construction as aforesaid whereby the flexible fabric material thereof is substantially free from operating local stress concentrations, such as is especially important when operating under high speed rough water conditions. The present invention provides a finger construction of such nature that its local geometry allows the fabric thereof to take on a truly ideally inflated configuration, without any localized buckling and/or distortions thereof. Thus, rapid wear problems such as have haunted prior art designs of such fingers are avoided. Other objects and advantages of the invention will appear from the description hereinafter.

BRIEF SUMMARY OF THE INVENTION

The stern seal construction of the present invention embodies several novel features which are combined in an overall assembly of fingers which are basically of non-scoop characteristics; individually serviceable, and per se are free of stress concentration forces under all operation conditions. This capability is acquired by tailoring the sidewalls of the fingers so that the upper and lower edge portions thereof are of opposed catenary curve configurations and are affixed therealong to tensionally rigid means attached by resilient connection devices at the forward ends thereof to the hull of the ship. In a preferred mode of construction, a pair or more of such fingers constructed in accordance with the invention are operationally unitized by means of a common water-planing flap which is attached to the major bottom edge portions of the sidewall of the fingers, but is free from the rearmost tip ends of the fingers, thereby providing for water drainage therefrom, as well as freedom from local fabric distortion problems. However, it is to be understood that such water-planing flaps may be structuraly integrated with any preferred number of fingers, or may be split into parts, each of which is functionally integrated with only a single finger for ease of maintenance/replacement purposes.

The fabric sheeting from which the fingers are constructed is preferably arranged so that throughout the sidewalls of the fingers the warp threads run in directions substantially normal to the semi-cylindrical rear wall portions of the fingers and then girth-wise therearound for construction and maintenance economy purposes. Also, the geometries of the fingers are preferably tailored so that the vertical profile lines of the semi-cylindrical rear wall portions thereof stand at angles somewhat less than 90° from the horizontal water surface, so that the lower sections of the fingers are only indirectly tied back to the forward attachments of the fingers to the hull of the ship. Thus, the lower sections of the fingers are freed to shed or relieve drag producing loads without being propense to collapsing under operating conditions.

THE DRAWING

FIG. 1 of the accompanying drawing is a rear end elevational view of a SES employing a preferred form of stern seal construction of the present invention;

FIG. 2 is a side elevational view taken as along line 2—2 of FIG. 1, showing how the finger elements of the stern seal construction of FIG. 1 are mounted in a SES as a portion of the stern seal assembly thereof; and FIG. 3 is an enlarged scale fragmentary perspective view with portions broken away, illustrating how a pair or more of such seal fingers of the invention may be mounted in unitized relation at the stern of the ship in accordance with a preferred mode of seal construction of the invention.

DETAILED SPECIFICATION

As shown in the drawing herewith at FIGS. 1 and 2, the invention may be embodied in an otherwise conventional type surface effect ship having a main hull or platform 12 which is buoyantly supported relative to a body of water such as by means of opposite sidehulls 14—14. To enable the ship to operationally ride substantially higher upon a cushion of air, the sidehulls are bridged at the bow end of the ship by means of a bow seal device (not shown), and in this case at the stern end of the ship by means of a seal system of the present invention which is shown generally at 15 and which comprises an assembly of segments or fingers 16 extending laterally between the stern ends of the sidehulls 14—14. Thus, as shown in the above referenced patents, the space beneath the ship platform 12 and the sidehulls 14—14 is adapted to transitionally confine a cushion of air for partially raising the ship out of water whenever a suitable supply of compressed air is furnished thereto, such as by means of blowers or the like, as is well known in the art.

Whereas the invention is illustrated at FIG. 1 as being embodied in a stern seal assembly comprising some twelve such fingers, it is to be understood that the seal structure may comprise any number of fingers other than as are shown. In any case the fingers are to be formed of any suitably flexible air-impervious sheet material(s) such as are known in the art. In the case of the present invention the fingers 16 are of trough-shaped open top form, and are so mounted under the main hull 12 of the ship as to be in open communication with the air cushion space under the ship. The leading end portions of the fingers 16 at the opposite sides 17—17 thereof are attached by resilient means such as springs as shown at 21 (FIGS. 2 and 3) to the ship platform structure 12 by means of gusset plates 22 carried by a base plate 23; this assembly being welded or otherwise fixed to the hull.

As best shown at FIGS. 2 and 3, the sidewall portions 17—17 of the fingers 16 terminate at their aft ends in semicylindrical end wall portions 18 (when inflated), and their upper edges in rolled over flap or "grommet" configurations 24 which are wrapped around and fastened to tension ropes or cables 25. At their forward ends, the cables engage brackets 26 to which the springs 21 connect. At their downstream ends, the sidewall portions 17—17 terminate in arcuately shaped flange formations 27 which are affixed to a resilient flap panel 28 which extends horizontally across the width of the stern seal assembly and is attached thereto such as by means of a fastening strip 29. At their aft ends, the cables 25 are locked to the flap panel 28 or may be locked to the hull 12 such as shown at 30 (FIG. 2). It is to be noted, however, that the flap panel 28 as shown herein, may alternatively be provided in separate forms and individually attached to each finger or any preferred number thereof.

The bottom edges of the sidewalls of the fingers 16 are lapped into and affixed at their opposite ends such as shown at 34, or by any other suitable means, to upstanding side flanges 36 which extend from a water-planing front closure plate 38 which thereby provides a bottom front closure for the fingers 16. The bottom plate 38 terminates at its upper end as shown at 40 (FIG. 3) short of the elevation of the bottom of the ship hull; and a flexible "splash-guard" 42 is connected as shown at 43 (FIGS. 2 and 3) to the fixed plate 23 to operate as a splash-preventing valve device controlling the space between the aft edge of the fixed plate 23 and the forward edge 40 of the planing plate 38 so as to permit the transient air cushion supply from beneath the hull to maintain pressurized operations of the fingers 16, while minimizing water splash intakes into the fingers under ship operating conditions.

It is a feature of this invention that the finger bottom closure plates 38 are formed of stiffened (but flexible) elastomeric material; and that the bottom rear end portions 44 of the fingers 16 are unattached from the rearmost end portions 46 of the bottom plates 38. Hence, the flap portions 46 are free to hinge relative to the rear ends of the fingers such as along line 48 (FIG. 3) to permit water drainage therefrom.

It is of particular note that in accordance with this invention the sheet material comprising the sidewall portions of the fingers 16 is tailored so as to conform to a catenary geometry such as will avoid imposition of stress concentrations in the sheet material per se. Thus, as shown at FIGS. 2 and 3, the upper edges of the finger sidewalls and their supporting cables 25 are in combination designed to assume stress-beneficiating catenary curve configurations consistent with the geometry of the finger assembly, including the cables 25 and the closure plate 38, under all operational load imposing conditions. The sheet materials forming the fingers are thereby freed from localized stress concentrations under operating conditions, thereby improving the performance and life capabilities of the structure. The provision of catenary tailoring and spring attachments to the hull combine to provide a SES stern seal construction which substantially avoids scooping/high drag problems, especially when operating at speeds over rough water and/or while negotiating "hump" situations.

As shown at FIG. 2, each finger 16 is tailored so that the angle $\beta$ included between the profile of the semicylindrical aft wall portion 18 thereof relative to the median plane of the front closure plate 38 of the finger (such as is indicated at 39) is somewhat less than 90°. This relieves operating loads on the finger fabric by avoiding direct tension paths therein back to the supporting structure incidental to scooping occasions. However, when a seal system of this character is employed to utilize only the cushion air for the source of its inflation pressures, this angle may not be made much less than 90° without inviting undue tendencies for the finger to collapse under typical operating conditions. Accordingly, the fingers are preferably designed so that this angle is within the range of 75° to 85° depending on the length of the finger tails or sidewall portions 17—17. The angle $\beta$ is therefore variable and controls the degree of finger stability.

Thus, the invention provides a stern seal system featuring the use of novelly tailored segments or fingers which are easily serviceable by crew members while the SES is standing in water; and which are under operating conditions of improved non-scooping capability and have the potentials for longer life. The system requires only cushion air for inflation, thereby dispensing with extra duct work and higher pressure fans, such as would incur extra pressure loadings.

What is claimed is:

1. A surface effect ship of the type having a main hull subtended by rigid parallel sidehulls and bow and stern seal means for transitionally maintaining an air cushion thereunder;

wherein said stern seal means comprises a plurality of air inflatable finger-like segments extending downwardly below said main hull in side-by-side relation between said sidehulls, each of said segments being formed of flexible air-impervious sheet material arranged in a trough-like configuration having vertically parallel sidewall portions and interconnecting semi-cylindrical rear wall portions said sidewall portions having upper and lower edge portions oppositely profiled in catenary curve configurations;

tension cord means affixed to said upper edge portions of said sidewall portions and extending in catenary suspended fashion in the fore/aft directions of said main hull, said tension cord means having fore and aft ends thereof connected to said main hull; and a water-planing front closure plate supported by said segments to incline upwardly in the direction of the ship forward travel by affixing said lower edge portions to opposite sides of said closure plate, said closure plate having a rearmost end portion arranged to underlie said rear wall portions, and wherein the bottom edge portions of said rear wall portions are unattached to said rearmost end portion of said closure plate, thereby permitting water drainage from said finger-like segments while damping therefrom the buffeting effects of irregular water surfaces over which the ship is traveling.

2. A surface effect ship as set forth in claim 1 wherein said closure plate is formed of somewhat flexible material and said rearmost end portion is free to hinge relative to said rear wall portion along a line extending horizontally across said stern seal means.

3. A surface effect ship as set forth in claim 1 wherein said fore ends of said tension cord means are attached to said main hull by resilient connection means.

4. A surface effect ship as set forth in claim 2 wherein said fore ends of said tension cord means are attached to said main hull by resilient spring connection means and said aft ends of said tension cord means are attached to said main hull by rigid connection means.

5. A surface effect ship as set forth in claim 1 wherein upper edge portions of said rear wall portions have arcuately shaped upper edges attached to a resilient flap means extending horizontally across said stern seal means and dependent from said main hull.

6. A surface effect ship as set forth in claim 1 wherein said closure plate terminates at an upper end below said main hull whereby to provide a space permitting inlet of pressurized air from said air cushion into said segments, and a resilient splash-guard extends downwardly from said main hull ahead of said upper end of said closure plate and provides a valve device for minimizing water intake into said segments through said space.

7. A surface effect ship as set forth in claim 1 wherein a plurality of said segments are attached at their bottom sidewall edge portions to a single water-planing closure plate, whereby said plate unitizes the water-planing operations of said plurality of segments.

8. A surface effect ship as set forth in claim 2 wherein a plurality of said segments are attached at their bottom sidewall edge portions to a single water-planing closure plate, whereby said plate unitizes the water-planing operation of said plurality of segments.

9. A surface effect ship as set forth in claim 3 wherein a plurality of said segments are attached at their bottom sidewall edge portions to a single water-planing closure plate, whereby said plate unitizes the water-planing operation of said plurality of segments.

10. A surface effect ship as set forth in claim 4 wherein a plurality of said segments are attached at their bottom sidewall edge portions to a single water-planing closure plate, whereby said plate unitizes the water-planing operation of said plurality of segments.

11. A surface effect ship as set forth in claim 5 wherein a plurality of said segments are attached at their bottom sidewall edge portions to a single water-planing closure plate, whereby said plate unitizes the water-planing operation of said plurality of segments.

12. A surface effect ship as set forth in claim 1 wherein said flexible sheet material forming said finger-like segments is arranged so that throughout said sidewall portions of said segments the warp threads run in directions substantially normal to said semi-cylindrical rear wall portions.

13. A surface effect ship as set forth in claim 1 wherein the angle included between the profile of said semi-cylindrical rear wall portion of each finger-like segment relative to the median plane of said closure plate is less than 90°.

14. A surface effect ship as set forth in claim 6 wherein said fore ends of said tension cord means are attached to said main hull by resilient connection means.

15. A surface effect ship as set forth in claim 14 wherein said closure plate is formed of somewhat flexible material and said rearmost end portion is free to hinge relative to said rear wall portions along a line extending horizontally across said stern seal means.

16. A surface effect ship as set forth in claim 13 wherein upper edge portions of said rear wall portions have arcuately shaped upper edges attached to a resilient flap means extending horizontally across said stern seal means and dependent from said main hull.

* * * * *

UNITED STATES PATENT AND TRADEMARK OFFICE
CERTIFICATE OF CORRECTION

PATENT NO. : 4,494,473
DATED : January 22, 1985
INVENTOR(S) : Anthony Y. Simpson It is certified that error appears in the above–identified patent and that said Letters Patent are hereby corrected as shown below:

Col. 2, line 4 - "sidewall" should be -- sidewalls --.

Col. 2, line 9 - "structuraly" should be -- structurally --.

Col. 4, line 54 - After "portions", insert -- , --.

Col. 5, line 12 - "portion" should be -- portions --.

Col. 6, line 38 - "13" should be -- 15 --.

Signed and Sealed this

Second Day of July 1985

[SEAL]

Attest:

DONALD J. QUIGG

Attesting Officer    Acting Commissioner of Patents and Trademarks